(12) United States Patent
Yu

(10) Patent No.: US 6,839,051 B2
(45) Date of Patent: Jan. 4, 2005

(54) TWO-AXIS CURSOR CONTROL APPARATUS

(75) Inventor: Yat Shun (Damien) Yu, British Columbia (CA)

(73) Assignee: VTech Communications, LTD., Tai Po (HK)

( * ) Notice: Subject to any disclaimer, the term of this patent is extended or adjusted under 35 U.S.C. 154(b) by 280 days.

(21) Appl. No.: 10/059,472

(22) Filed: Jan. 29, 2002

(65) Prior Publication Data

US 2002/0101403 A1 Aug. 1, 2002

(51) Int. Cl.[7] .................................................. G09G 5/08
(52) U.S. Cl. ...................... 345/163; 345/163; 345/167; 345/157; 250/231.17; 250/231.18
(58) Field of Search ................................ 345/163, 156, 345/167, 157, 158, 159, 160, 164, 165, 166; 250/231.17, 231.18

(56) References Cited

U.S. PATENT DOCUMENTS

| | | | | |
|---|---|---|---|---|
| 4,951,048 A | * | 8/1990 | Ichikawa et al. ............. 341/15 |
| 5,541,621 A | * | 7/1996 | Nmngani ..................... 345/167 |
| 5,886,310 A | | 3/1999 | Kataoka et al. ................ 200/14 |
| 5,894,118 A | | 4/1999 | Nishimoto et al. .......... 200/527 |
| 5,952,628 A | | 9/1999 | Sato et al. ....................... 200/4 |
| 6,097,964 A | | 8/2000 | Nuovo et al. ................ 455/550 |
| 6,127,636 A | | 10/2000 | Parvulescu et al. ........ 200/11 R |
| 6,127,676 A | * | 10/2000 | Tseng ..................... 250/231.13 |
| 6,184,480 B1 | | 2/2001 | Nishimoto et al. ............. 200/4 |
| 6,194,673 B1 | | 2/2001 | Sato et al. ....................... 200/4 |
| 6,198,054 B1 | | 3/2001 | Janniere ..................... 200/5 R |
| 6,198,057 B1 | | 3/2001 | Sato et al. ..................... 200/28 |
| 6,218,635 B1 | | 4/2001 | Shigemoto et al. .......... 200/570 |
| 6,229,103 B1 | | 5/2001 | Yamamoto et al. ............. 200/4 |
| 6,236,002 B1 | | 5/2001 | Chou ............................. 200/4 |
| 6,256,013 B1 | * | 7/2001 | Siddiqui ..................... 345/163 |
| 6,311,572 B1 | * | 11/2001 | Gier .......................... 73/865.9 |
| 2002/0180701 A1 | * | 12/2002 | Hayama et al. ............. 345/163 |

* cited by examiner

Primary Examiner—Quochien B. Vuong
Assistant Examiner—Shaima Q. Aminzay
(74) Attorney, Agent, or Firm—Shaw Pittman LLP

(57) ABSTRACT

A two-axis ball-based cursor control apparatus is provided, which includes a housing; a spherical ball contained partially within the housing; two rotors in contact with the spherical ball and two corresponding axles; two screw devices associated with each rotor-axle pair, each screw device having a continuous helical thread; a plurality of light sensors, each associated with a screw device; and a means for processing the signal from the light sensors. When the spherical ball is rotated by the user, its motion about each axis of rotation is translated to one of the screw devices by means of the corresponding rotor-axle pair. The rotation of the screw devices causes the helical thread on each to momentarily interrupt the light beam generated by each sensor at least once during each revolution of the screw device, thereby generating a signal which is translated into two-dimensional motion of a cursor on an electronic display screen.

20 Claims, 1 Drawing Sheet

TWO-AXIS CURSOR CONTROL APPARATUS

BACKGROUND OF THE INVENTION

1. Field of the Invention

The present invention relates in general to a two-axis ball-based cursor control apparatus, such as a mouse or trackball, and in particular to a cursor control apparatus incorporating a helical screw mechanism for measuring the rotational displacement of the ball, in order to minimize the overall size of the cursor control apparatus.

2. Background Art

Two-axis cursor control devices are well-known in the art. These types of devices are common components of personal computer systems used for controlling the movement of a cursor appearing on a video monitor. Cursor control devices are also finding use in handheld devices such as PDA's and cellular telephones where graphical user interfaces are manipulated by the user in operating the device. Two well-known forms of such devices include the computer mouse and the trackball. A computer mouse consists of a spherical ball, generally approximately one-half inch in diameter and freely rotatable about two axes of rotation, mounted within a larger housing which rests on a flat surface, so that a portion of the ball protrudes from the bottom of the housing and comes into contact with the surface. Typically, a pair of rotors come into contact with the ball, one aligned with each axis. Each of these rotors are in turn connected by an axle to a disk with uniformly spaced slots or holes spaced around the outer portion thereof. When the mouse is moved along the flat surface, the rotation of the ball is translated to the rotors, and in turn to the associated disks. Light emitters and sensors are positioned spanning each of the disks whereby the beam of light is alternatively passed through the disk to the sensors and then blocked from the sensors as the disk rotates. Each disk typically has two pairs of emitters and sensors associated therewith in order to determine the rate and direction of rotation of the disk. The sensors are connected to an electrical circuit which generates an electrical signal. From the signals generated by each of the two disks positioned perpendicular to one another, the direction and acceleration of the displacement of the ball, and hence of the mouse itself, is determined. This information is then translated into motion of a cursor on the screen of the computer using a predetermined relationship between the magnitude of the mouse displacement in each direction and the distance which the cursor moves in that direction. Thus, the user's horizontal and vertical movement of the mouse on the flat surface is translated into horizontal and vertical movement of the cursor on the screen.

A trackball is a similar type of cursor control apparatus in which the user merely rotates the ball itself instead of moving the entire housing. The ball typically protrudes from the top of its housing, where it can be rotated directly by the user by hand. The remainder of the device is typically substantially similar to that described above, with the rotation of the ball translated to a pair of rotors associated with each axis of rotation, and then to a pair of disks, whose motion is then translated into cursor motion by light sensors. Thus, unlike a mouse, a trackball apparatus remains stationary while the user directly rotates the ball itself.

One significant disadvantage of such prior art construction of such devices is its overall size. A computer mouse typically measures several inches in length and width and approximately an inch in height, and a typical trackball apparatus is generally even larger. One constraint on the size of such cursor control devices is the size of the disks associated with the light emitters and sensors. A disk must have a minimum number of slots or holes to generate a sufficient number of pulses in a signal for the mouse to be useable. The number of slots or holes in the disk correspond to the resolution of the mouse. For example, a disk with only four slots or holes will generate four pulses for each rotation of the axle as driven by the roller and in turn the ball. However, any movement of less than a quarter turn of the axle will result no change in the status of the beam and thus movement of the mouse will go undetected.

Even though the speed of the axle can be adjusted by gearing as between the ball and the roller, this gearing may result in an overly sensitive mouse that is essentially uncontrollable.

Accordingly there exists a significant limitation on the minimum size of the disks, and therefore on the minimum thickness of the cursor control devices themselves. This limitation makes devices such as those known in the prior art often impractical for use in small, hand-held electronic devices such as cellular telephones and personal digital assistants where size is crucial and little room is available within such devices for cursor control apparatus. Nevertheless, ball-based cursor control devices remain a preferred mechanism for manipulating a graphical user interface.

It is therefore desirable to provide a ball-based cursor control device which provides for cursor movement in two directions that is significantly smaller and thinner than computer mice and trackballs in the known prior art.

These and other objects of the present invention will become apparent to those of ordinary skill in the art in light of the present specifications, drawings, and claims.

SUMMARY OF THE INVENTION

The present invention is directed to a two-axis ball-based cursor control apparatus comprising a housing; a spherical ball partially within the housing capable of freely rotating about at least two axes; two rotors in contact with the outer surface of the spherical ball, and two axles, one associated with each rotor, positioned so as to transfer the rotational motion of the spherical ball about each axis to one rotor and then to its corresponding axle; two screw devices each comprising at least one continuous helical thread, each of which is associated with one rotor-axle pair such that the rotation of the axle is transferred to the screw device; a plurality of light sensors, each associated with one screw device; and a means for processing the signal from the light sensors in order to generate motion of a cursor on an electronic display screen corresponding to the direction and magnitude rotation of the spherical ball. When the spherical ball is rotated, its rotational motion about each axis is transferred, in turn, to the corresponding screw device, which in turn causes the helical thread to periodically break each light beam at least once during each revolution of the screw device.

In one embodiment of the invention, the spherical ball protrudes from the housing such that the spherical ball is in constant contact with a flat surface, and the housing is moved across the surface in order to generate motion of a cursor on an electronic display screen. This embodiment may include at least one button member for allowing the user to select options corresponding to particular cursor locations on the display screen.

In another embodiment of the invention, the spherical ball protrudes from said housing such that the spherical ball is directly rotated by the user in order to generate motion of a cursor on an electronic display screen. This embodiment may also include at least one button member for allowing the user to select options corresponding to particular cursor locations on the display screen.

DETAILED DESCRIPTION OF THE INVENTION

Figure 2:
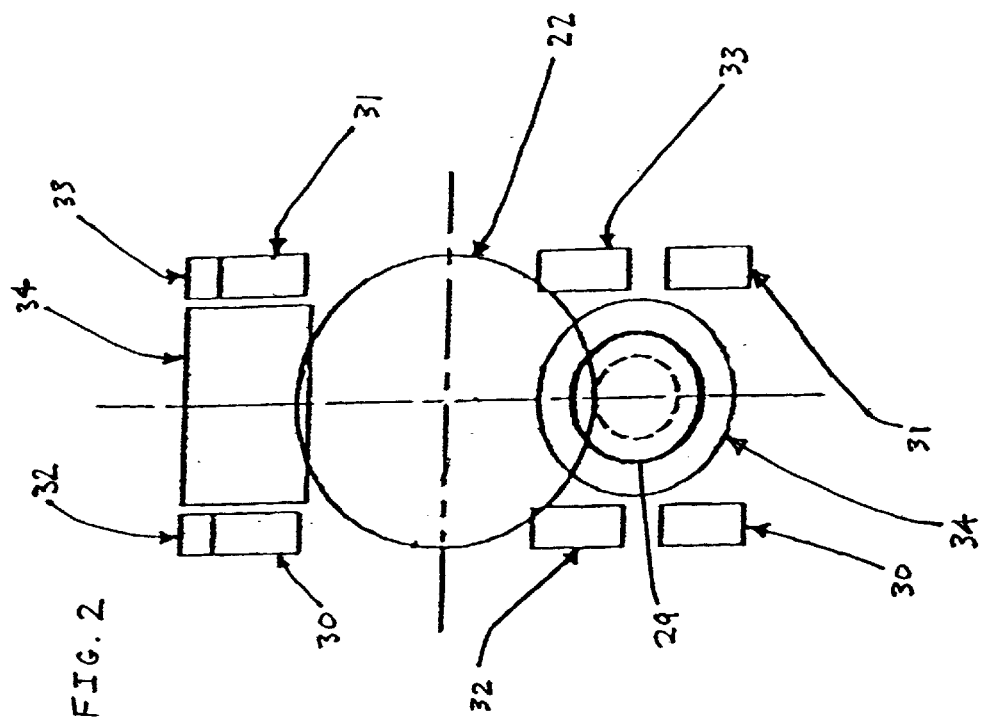
FIG. 2 is a side elevational view of the cursor control apparatus shown in FIG. 1.

While this invention is susceptible of embodiment in many different forms, there are shown in the drawings and will be described herein one specific embodiment, with the understanding that the present disclosure is to be considered as an exemplification of the principles of the invention and is not intended to limit the invention to the embodiment illustrated.

Figure 1:
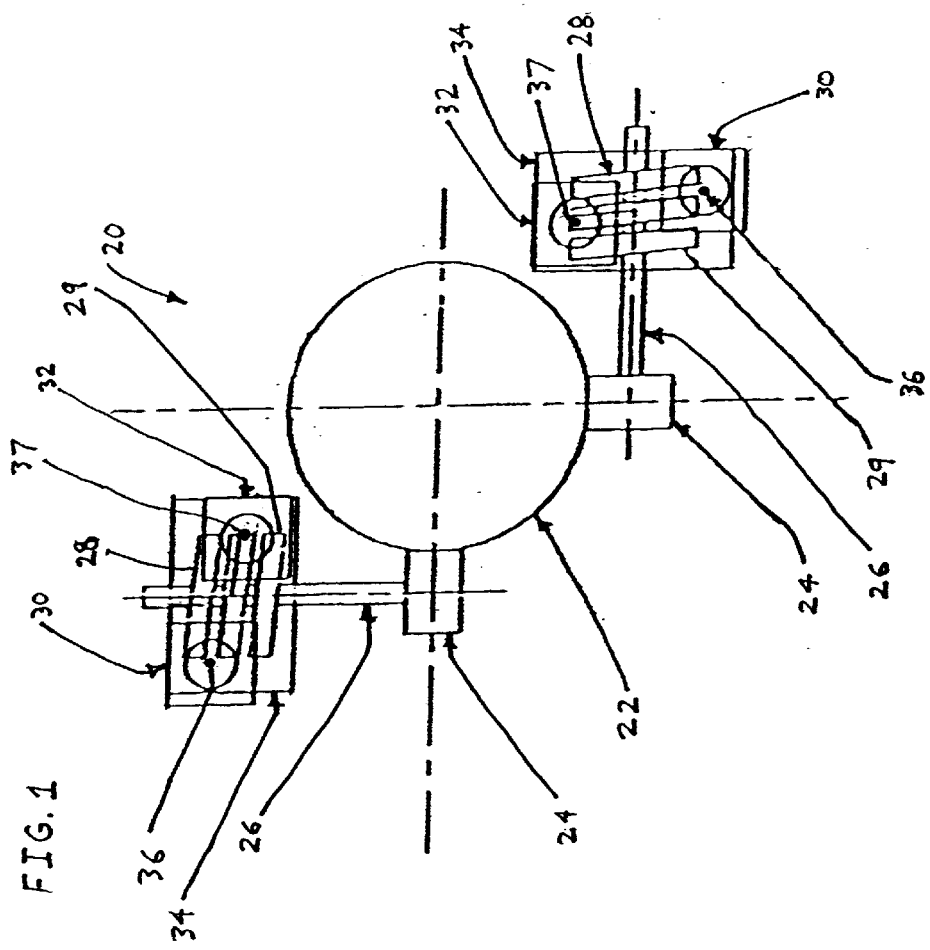
FIG. 1 is a top view of a cursor control apparatus according to the present invention.

Two-axis ball-based cursor control apparatus 20 is shown in FIGS. 1 and 2 as including spherical ball 22, rotors 24, axles 26, helical screw members 28, light transmitters 30 and 32, light sensors 31 and 33, and protective sheaths 34. Each screw device 28 has two transmitter-sensor pairs associated with it, namely transmitter 30-sensor 31 and transmitter 32-sensor 33. Cursor control apparatus 20 also includes a housing, which is not shown, but is typically of a rectangular character such as is conventionally found in computer mice or trackballs. Cursor control apparatus 20 is intended for use in controlling the movement of a cursor on electronic display screens, including cathode-ray screens, such as those commonly found in computers, and liquid crystal displays of the type commonly used in hand-held electronic devices, such as personal digital assistants (PDAs), cellular telephones, and the like.

In order to move the cursor on the display screen, the user rotates spherical ball 22 about one or both axes of rotation by exerting a rotational force on the portion of spherical ball 22 which extends out of the housing. This may be accomplished either by moving the entire housing along a flat surface which is in constant contact with spherical ball 22, as with a computer mouse, or by manipulating spherical ball 22 directly by hand, as with a trackball.

Rotors 24 are positioned in contact with spherical ball 22 so that the rotational motion of spherical ball 22 about each axis of rotation is transferred to the corresponding rotor 24. This rotation is then transferred to helical screw members 28 by means of axles 26. Each screw device 28 is contained within a protective sheath 34. Each of screw devices 28 includes a continuous helical thread 29, located on the outer surface of screw device 28. The size of helical threads 29 is exaggerated in FIG. 1 in order to more clearly illustrate the principle behind helical screw members 28. In the embodiment illustrated, the helical threads are illustrated as a single thread extending along a portion of member 28. In an alternative embodiment of the invention, two or more sets of threads intertwined with one another may be included such that the beam may be interrupted more frequently with each rotation of the axle. As spherical ball 22 is rotated about one or both of its axes of rotation by the user, screw devices 28 rotate in a clockwise or counterclockwise direction, depending on the direction of rotation of spherical ball 22 about each axis. A pair of light transmitters 30 and 32 and a pair of light sensors 31 and 33 are aligned on opposite sides of each screw device 28 and slightly offset from one another along helical thread 29. As shown in FIG. 1, each protective sheath 34 contains small holes aligned with transmitters 30 and 32 and sensors 31 and 33, so that light may pass from the transmitters to the sensors. At the instant shown in FIG. 1, a beam of light 36 (indicated by a dot) from light transmitter 30 passes through a gap in helical thread 29 uninterrupted, whereas a beam of light 37 (indicated by a dot) from light transmitter 32 is shown interrupted by helical thread 29. Light sensors 31 and 33 determine whether, at any instant, beams 36 and 37, respectively, are interrupted.

As screw devices 28 rotate, the orientation of helical thread 29 will continually change so that, at some instants, beam 36 is interrupted by helical thread 29 and beam 37 is uninterrupted, and at other instants, neither of beams 36 and 37 are interrupted. This allows for the determination of the direction of rotation of screw devices 28, depending on the sequence in which each beam is interrupted. Light sensors 31 and 33 generate an electrical signal which corresponds to the order and rate of interruption of beams 36 and 37, which in turn is converted to motion of a cursor on the display screen corresponding to the motion of spherical ball 22.

The use of screw devices 28 in cursor control apparatus provides the potential for significant space savings compared with existing mouse and trackball type devices. Typically, the diameter of the rotating disk used in such devices is many times larger than the diameter of the axle portion and presents constraint on the size of the device. Cursor control apparatus 20, however, eliminates this size constraint by replacing the rotating disks with helical screw members 28, in which the size of helical thread 29 is the primary constraint. As mentioned above, the size of helical thread 29 in FIG. 1 has been exaggerated in order to clearly set forth the arrangement of screw devices 28, such that helical thread 29 appears to extend outward beyond axle 26 by a distance greater than the diameter of axle 26 itself. However, it is contemplated that the size of helical thread 29 will in actuality be significantly smaller, such that the total diameter of screw device 28 will be only slightly larger than that of axle 26. Thus, it is contemplated that such a device can be constructed that has only a fraction of the thickness of a typical computer mouse.

Cursor control apparatus 20 may also include a number of button or switch members for allowing the user to make selections in conjunction with the position of the cursor on the screen, such as are found on the top side of a conventional computer mouse.

The foregoing description and drawings are merely to explain and illustrate the invention, and the invention is not limited thereto except insofar as the independent claims are so limited, as those skilled in the art with the present disclosure before them will be able to make modifications and variations therein without departing from the scope of the invention.

What is claimed is:

1. A two-axis ball-based cursor control apparatus comprising:
   a housing;
   a spherical ball positioned partially within said housing and capable of freely rotating about at least two axes;
   two rotors in contact with the outer surface of said spherical ball, and two axles, one associated with each of said rotors, each of said rotors positioned so as to transfer the rotational motion of said spherical ball about one axis of rotation to the corresponding axle;
   two screw devices positioned within said housing, each of said screw devices comprising at least one continuous helical thread associated with the outer surface of said screw device, each of said screw devices associated with one of said rotors and said axles such that the rotation of said axles is transferred to said screw devices;

a plurality of light sensors having a continuous light beam, each of said light sensors associated with one of said screw devices, such that the rotation of said screw device causes said at least one helical thread of said screw device to temporarily interrupt the light beam at least once during each revolution of said screw device; and a means for processing the signal from said light sensors in order to generate motion of a cursor on an electronic display screen corresponding to the direction and magnitude of rotation of said spherical ball.

2. The two-axis cursor control apparatus according to claim 1, wherein said spherical ball protrudes from said housing such that said spherical ball is in constant contact with a flat surface, and said housing is moved across the surface in order to generate motion of a cursor on the electronic display screen.

3. The two-axis cursor control apparatus according to claim 2, further comprising at least one button member for allowing a user to select options corresponding to particular cursor locations on the electronic display screen.

4. The two-axis cursor control apparatus according to claim 1, wherein said spherical ball protrudes from said housing such that said spherical ball is directly rotated by a user in order to generate motion of a cursor on the electronic display screen.

5. The two-axis cursor control apparatus according to claim 4, further comprising at least one button member for allowing the user to select options corresponding to particular cursor location on the electronic display screen.

6. A cursor control apparatus comprising:

a housing;

a spherical ball positioned partially within the housing and capable of freely rotating about at least two axes;

two rotors in contact with the spherical ball, and two axles, one associated with each of the rotors, each of the rotors positioned so as to transfer rotational motion of the spherical ball about one axis of rotation to the corresponding axle;

two screw devices positioned within the housing, each of the screw devices comprising at least one continuous helical thread associated with the outer surface of the screw device, each of the screw devices associated with one of the rotors and the axles such that the rotation of the axles is transferred to the screw devices;

a plurality of light sensors having a continuous light beam, each of the light sensors associated with one of the screw devices, such that the rotation of the screw device causes the at least one helical thread of the screw device to temporarily interrupt the light beam at least once during each revolution of the screw device; and means for processing signal from the light sensors to generate motion of a cursor on an electronic display screen corresponding to direction and magnitude of rotation of the spherical ball.

7. The apparatus of claim 6, wherein the spherical ball protrudes from the housing such that the spherical ball is in constant contact with a flat surface, and the housing is moved across the surface to generate motion of a cursor on the electronic display screen.

8. The apparatus of claim 6, further comprising at least one button member for allowing a user to select options corresponding to particular cursor locations on the electronic display screen.

9. The apparatus of claim 6, wherein the spherical ball protrudes from the housing such that the spherical ball is directly rotated by a user to generate motion of a cursor on the electronic display screen.

10. The apparatus of claim 6, further comprising a protective sheath configured to contain each of the screw devices.

11. The apparatus of claim 10, wherein the protective sheath comprises one or more small holes.

12. The apparatus of claim 11, wherein at least one of the small holes is aligned with the continuous light beam.

13. The apparatus of claim 10, wherein the protective sheath comprises two small holes, wherein each small hole is aligned with a continuous light beam.

14. A method for generating motion of a cursor on an electronic display screen, the method comprising:

contacting two rotors with a spherical ball, wherein each of the two rotors is associated with one of two axles, each of the rotors is positioned so as to transfer rotational motion of the spherical ball about one axis of rotation to the corresponding axle;

associating a screw device with each of the rotors such that the rotation of the axles is transferred to the screw device, wherein the screw device comprises at least one continuous helical thread associated with the outer surface of the screw device;

associating a light sensor having a continuous light beam with the screw device such that rotation of the screw device causes the at least one continuous helical thread of the screw device to temporarily interrupt the light beam at least once during each revolution of the screw device; and processing signal from the light sensor to generate motion of the cursor on the electronic display screen corresponding to direction and magnitude of rotation of the spherical ball.

15. The method of claim 14, further comprising partially positioning the spherical ball within a housing such that the spherical ball is capable of freely rotating about the two axes.

16. The method of claim 15, further comprising protruding the spherical ball from the housing such that the spherical ball is in constant contact with a flat surface, and the housing is moved across the surface to generate motion of a cursor on the electronic display screen.

17. The method of claim 15, further comprising associating at least one button member on the housing for allowing a user to select options corresponding to particular cursor locations on the electronic display screen.

18. The method of claim 15, further comprising protruding the spherical ball from the housing such that the spherical ball is directly rotated by a user to generate motion of a cursor on the electronic display screen.

19. The method of claim 14, further comprising containing the screw device in a protective sheath.

20. The method of claim 19, further comprising aligning a small hole on the protective sheath with the continuous light beam.

* * * * *